(12) United States Patent
Reis et al.

(10) Patent No.: US 8,615,726 B1
(45) Date of Patent: *Dec. 24, 2013

(54) SIZING A CELL LIBRARY

(75) Inventors: Andre Inacio Reis, Soborg (DK); Ole Christian Andersen, Bagsvaerd (DK)

(73) Assignee: Nangate Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,322

(22) Filed: Sep. 6, 2011

Related U.S. Application Data

(63) Continuation of application No. 12/479,603, filed on Jun. 5, 2009, now Pat. No. 8,015,517.

(60) Provisional application No. 61/059,742, filed on Jun. 6, 2008, provisional application No. 61/059,744, filed on Jun. 6, 2008, provisional application No. 61/059,745, filed on Jun. 6, 2008, provisional application No. 61/059,746, filed on Jun. 6, 2008.

(51) Int. Cl.
*G06F 17/50* (2006.01)
(52) U.S. Cl.
CPC .......... *G06F 17/505* (2013.01); *G06F 17/5072* (2013.01)
USPC ........... 716/132; 716/122; 716/123; 716/129; 716/130; 703/16
(58) Field of Classification Search
CPC ............................ G06F 17/505; G06F 17/5072
USPC ............. 716/132, 122, 123, 129, 130; 703/16
See application file for complete search history.

(56) References Cited

U.S. PATENT DOCUMENTS

| | | |
|---|---|---|
| 5,619,420 A | 4/1997 | Breid |
| 6,496,965 B1 | 12/2002 | van Ginneken et al. |
| 7,594,202 B2 | 9/2009 | de Dood et al. |
| 7,644,383 B2 | 1/2010 | Bartling et al. |
| 7,716,609 B1 | 5/2010 | Taheri |
| 8,015,517 B1 * | 9/2011 | Reis et al. ............ 716/103 |
| 8,214,787 B1 * | 7/2012 | Reis ...................... 716/134 |
| 8,219,962 B1 * | 7/2012 | Anderson ............. 716/133 |
| 2002/0053063 A1 | 5/2002 | Bhattacharya et al. |
| 2003/0088842 A1 | 5/2003 | Cirit |
| 2005/0278658 A1 | 12/2005 | Zhang et al. |
| 2006/0075375 A1 | 4/2006 | Rana et al. |
| 2006/0107239 A1 | 5/2006 | Zhang et al. |
| 2006/0248486 A1 | 11/2006 | Barnes |
| 2007/0006106 A1 | 1/2007 | Bartling et al. |
| 2007/0006109 A1 | 1/2007 | Bartling et al. |
| 2008/0127000 A1 | 5/2008 | Majumder et al. |
| 2009/0045845 A1 | 2/2009 | Graber |
| 2009/0055787 A1 | 2/2009 | Oh et al. |
| 2009/0199136 A1 | 8/2009 | Reis et al. |
| 2011/0296367 A1 * | 12/2011 | Reis et al. ............ 716/132 |

\* cited by examiner

*Primary Examiner* — Phallaka Kik
(74) *Attorney, Agent, or Firm* — Aka Chan LLP

(57) ABSTRACT

A cell library is automatically designed. An emphasis of a design methodology is on automatic determination of the desired or needed cell sizes and variants. This method exploits different variants on drive strengths, P/N ratios, topology variants, internal buffering, and so forth. The method allows generating libraries that are more suitable for efficient timing closure.

20 Claims, 11 Drawing Sheets

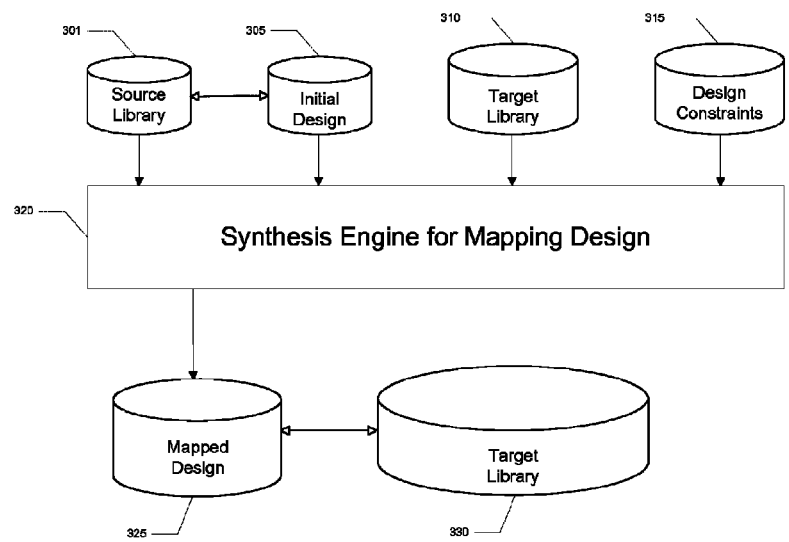
Figure 3
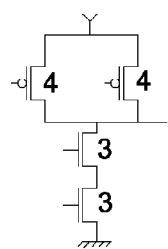  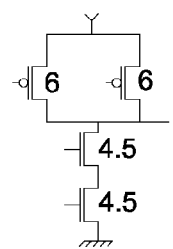
Figure 4A  Figure 4B

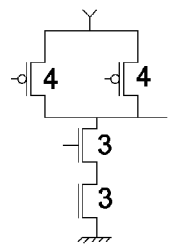 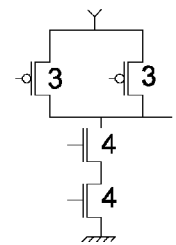
        Figure 5A                       Figure 5B
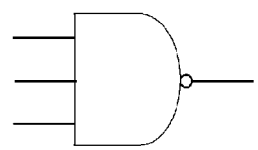 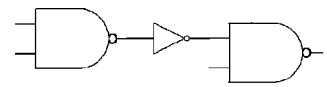
        Figure 6A                       Figure 6B

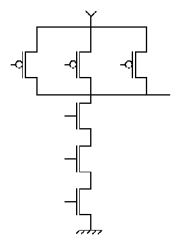 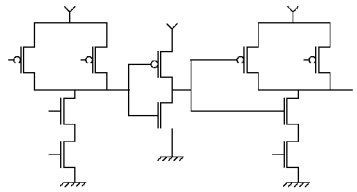 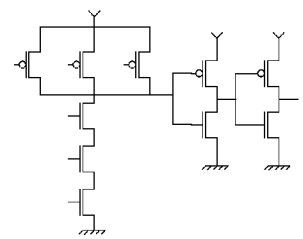
Figure 7A          Figure 7B          Figure 7C
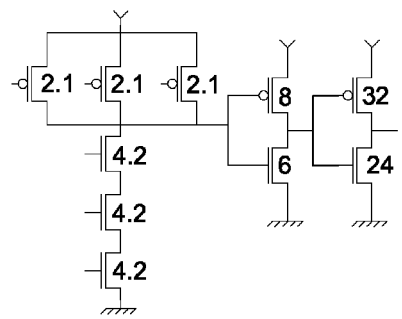 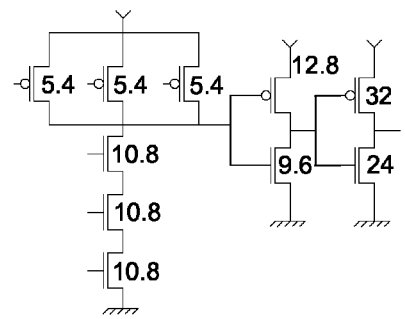
Figure 8A          Figure 8B

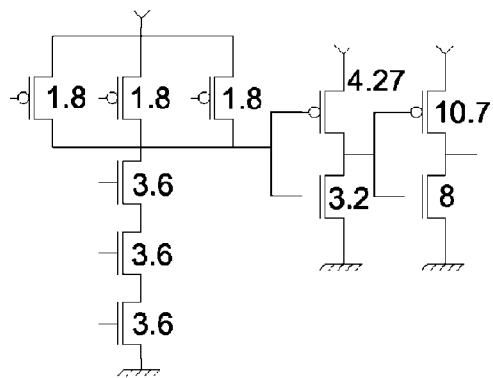
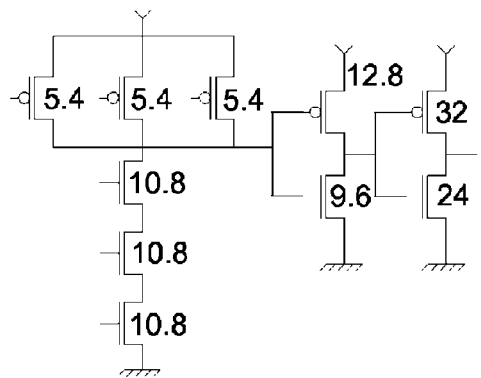
Figure 9A                    Figure 9B
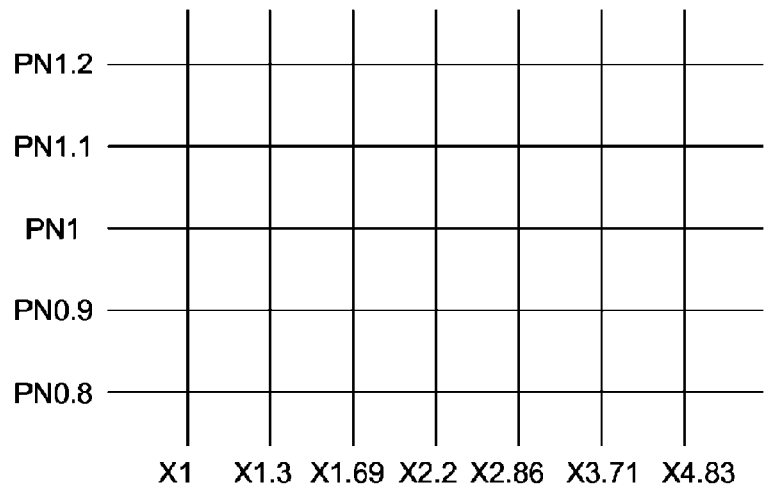
Figure 10

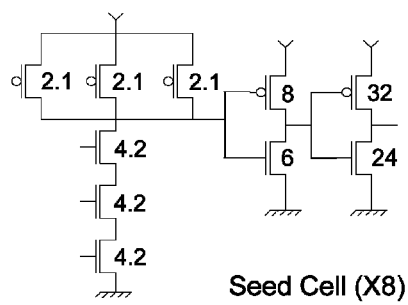
Figure 13A Seed Cell (X8)
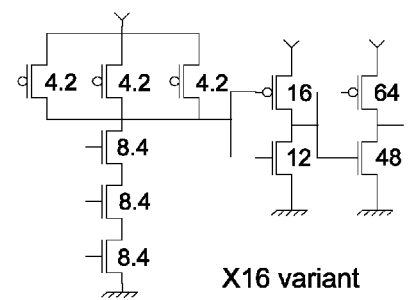
Figure 13B X16 variant
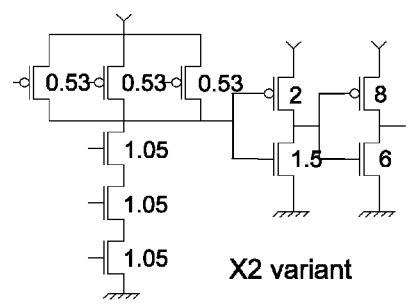
Figure 13C X2 variant
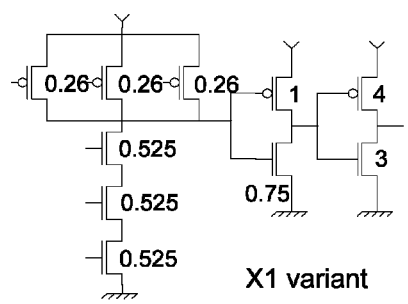
Figure 13D X1 variant Seed

X1

X1.5

X2.25

X3.38

X5.06

X7.59

X11.4

Seed

X0.1

X0.15

X0.225

X0.338

X0.506

X0.759

X1.14

Seed

X0.1

X0.15

X0.225

X0.338

X0.506

X0.759

X1.14

Reference: P/N
scale factor = 1
P/N=1.0855

P/N scale
factor = 0.9
P/N=0.9770

P/N scale
factor = 0.8
P/N=0.8684

P/N scale
factor = 1.1
P/N=1.1941

X1, P/N    sf =0.9

X1, P/N    sf =1

X1, P/N    sf =1.1

X2, P/N    sf =0.9

X2, P/N    sf =1

X2, P/N    sf =1.1

SIZING A CELL LIBRARY

CROSS-REFERENCE TO RELATED APPLICATIONS

This patent application is a continuation of U.S. patent application Ser. No. 12/479,603, filed Jun. 5, 2009, issued as U.S. Pat. No. 8,015,517 on Sep. 6, 2011, which claims the benefit of U.S. provisional patent applications 61/059,742; 61/059,744; 61/059,745; and 61/059,746, filed Jun. 6, 2008, which are incorporated by reference along with all other references cited in this application.

BACKGROUND OF THE INVENTION

This invention relates to the field of electronic design automation, and more specifically, to optimization of digital circuits whose design is based on cell libraries.

Integrated circuits are important building blocks of the information age and are critical to the information age, affecting every industry including financial, banking, legal, military, high technology, transportation, telephony, oil, medical, drug, food, agriculture, education, and many others. Integrated circuits such as DSPs, amplifiers, DRAMs, SRAMs, EPROMs, EEPROMs, Flash memories, microprocessors, ASICs, and programmable logic are used in many applications such as computers, networking, telecommunications, and consumer electronics.

Consumers continue to demand greater performance in their electronic products. For example, higher speed computers will provide higher speed graphics for multimedia applications or development. Higher speed Internet web servers will lead to greater on-line commerce including on-line stock trading, book sales, auctions, and grocery shopping, just to name a few examples. Higher performance integrated circuits will improve the performance of the products in which they are incorporated.

Large modern day integrated circuits have millions of devices including gates and transistors and are very complex. As process technology improves, more and more devices may be fabricated on a single integrated circuit, so integrated circuits will continue to become even more complex with time. To meet the challenges of building more complex and higher performance integrated circuits, software tools are used. These tools are in an area referred to as computer aided design (CAD), computer aided engineering (CAE), or electronic design automation (EDA). There is a constant need to improve these electronic automatic tools in order to address the desire for higher integration and better performance in integrated circuits.

Therefore, there is a need for improved techniques for electronic design automation.

BRIEF SUMMARY OF THE INVENTION

This invention provides methods to automatically design a cell library. The emphasis of the design method is on automatic determination of the needed cell sizes and variants. The method exploits different variants on drive strengths, P/N ratios, topology variants, internal buffering, and so forth. The method allows generating libraries that are more suitable for efficient timing closure.

A method to generate a cell library. The emphasis of this method is to obtain from the beginning a continuous spectrum of cells for the library, which will enable easier timing closure. The method starts with a group of functions that has to be in the library and for each function a set of cell variants is generated, in order to compose the final library. The cell variants can include a mix of drive strength variants, P/N ratio variants, topology variants (including buffer and stage variants, as well as varying the gain among stages).

A method to generate a continuous distribution of sizes for cells with the same functionality for receiving or deriving a seed transistor network corresponding to a functionality, deriving a distribution of target sizes to cover a range of target output capacitances, and deriving from a variety of P/N ratio variants for each size in the range.

In a specific implementation, a method to size a set of cells to be part of a cell library includes receiving a seed size for the cell, receiving a distribution of target drive strengths for the cell, and creating a set of cell sizes with the corresponding drive strengths from the seed size.

In another implementation, a method to size a set of cells to be part of a cell library includes receiving a seed size for the cell, receiving a distribution of target P/N ratios for the cell, and creating a set of cell sizes with the corresponding P/N ratios from the seed size.

In another implementation, a method to size a set of cells to be part of a cell library includes receiving a seed size for the cell, receiving a distribution of target drive strengths for the cell, receiving a distribution of target P/N ratios for the cell, and creating a set of cell sizes from the seed size with the corresponding drive strengths and P/N ratios.

In a specific implementation, a method to size a set of cells to be part of a cell library includes receiving a functionality for the cell, receiving a distribution of target drive strengths for the cell, generating alternative transistor networks for the cell, considering the functionality, generating seed sizes for the transistor networks, and creating a set of cell sizes with the corresponding drive strengths from the seed sizes.

In another implementation, a method to size a set of cells to be part of a cell library includes receiving a functionality for the cell, receiving a distribution of target P/N ratios for the cell, generating alternative transistor networks for the cell, considering the functionality, generating seed sizes for the transistor networks, and creating a set of cell sizes with the corresponding P/N ratios from the seed sizes.

In another implementation, a method to size a set of cells to be part of a cell library includes receiving a functionality for the cell, receiving a distribution of target drive strengths for the cell, receiving a distribution of target P/N ratios for the cell, generating alternative transistor networks for the cell, considering the functionality, generating seed sizes for the transistor networks, and creating a set of cell sizes from the seed sizes with the corresponding drive strengths and P/N ratios.

Furthermore, in various implementations, with several seed sizes, a subset of the generated cells is chosen to be part of the library, the seed size is generated taking into account a table of transistor sizes, or both.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 shows a synthesis engine for mapping a design, including associated data to the process.

FIG. 4A and FIG. 4B show two different drive strengths for a 2-input NAND cell.

FIG. 5A and FIG. 5B show two different skew variants for a 2-input NAND cell.

FIG. 6A and FIG. 6B show two different topology variants for a 3-input NAND cell.

FIG. 7A, FIG. 7B, and FIG. 7C show different transistor networks topologies for a NAND3 cell. The figure is divided into three items: (a) single stage, (b) 3 stages, decomposed into NAND2; and (c) 3 stages, output buffer.

FIG. 8A and FIG. 8B show two different seed sizes for a NAND3 network. The figure is divided into two items: (a) internal gain=4; and (b) internal gain=2.5.

FIG. 9A and FIG. 9B show different drive strengths for a NAND3 network derived from the same seed size. The figure is divided into two items: (a) drive strength X1; and (b) drive strength X3.

FIG. 10 shows bidimensional distribution grid illustrating the use of seven different drive strengths and five different P/N ratios derived from the initial seed, resulting in a distribution containing 35 different sizes.

FIG. 13A through FIG. 13D show a seed cell and three different sizes derived by scaling the seed size of the cell.

DETAILED DESCRIPTION OF THE INVENTION

This patent application incorporates by reference U.S. patent application 61/026,222, filed Feb. 5, 2008; U.S. patent application publication 2007/0214439, published Sep. 13, 2007; and U.S. provisional patent application 60/777,561, filed Mar. 1, 2006.

Figure 1:
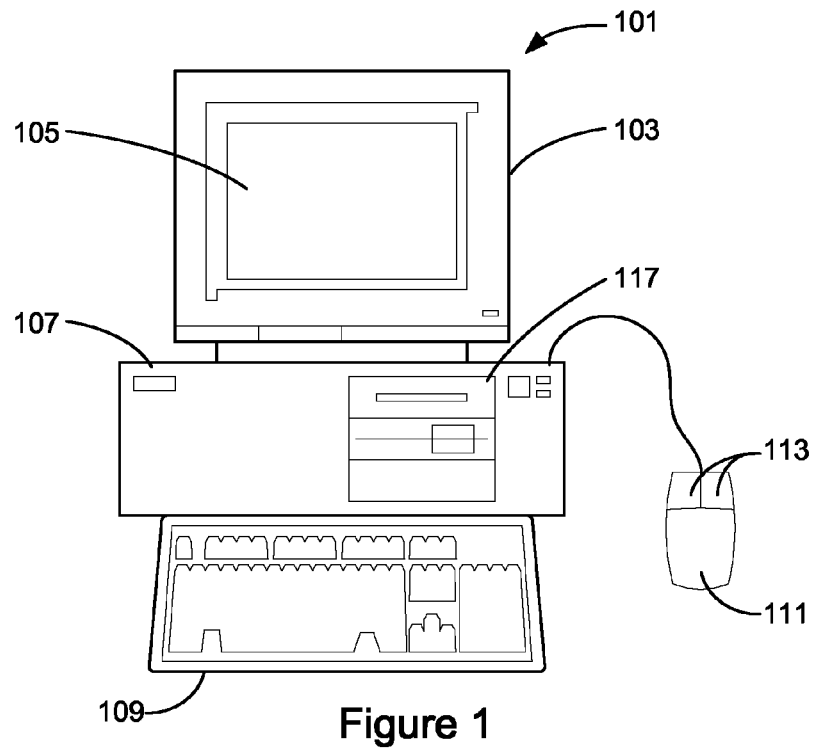
FIG. 1 shows a system of the present invention for performing electronic design automation.

FIG. 1 shows a system of the present invention. In an embodiment, the invention is software that executes on a computer workstation system, such as shown in FIG. 1. FIG. 1 shows a computer system 1 that includes a monitor 3, screen 5, cabinet 7, keyboard 9, and mouse 11. Mouse 11 may have one or more buttons such as mouse buttons 13. Cabinet 7 houses familiar computer components, some of which are not shown, such as a processor (including the possibility of a multiprocessor and gridding), memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version (e.g., computer program product) of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
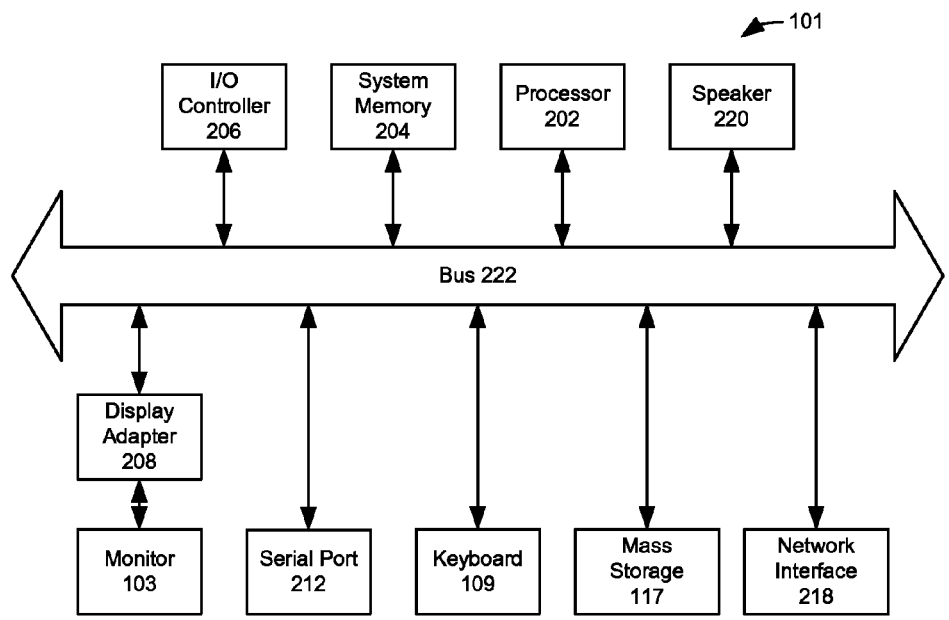
FIG. 2 shows a simplified system block diagram of a computer system used to execute software of the invention.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems. For example, a computer system could include more than one processor 202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, TCL and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

This invention relates to the optimization of digital circuits whose design is based on cell libraries. Most digital designs are currently based on cell libraries. This means that most design flows will have a step where the Boolean logic equations are mapped to an interconnected set of cells from the library. The cells from the library implement logic primitives (e.g., Boolean functions and storage elements) that are then connected to each other to produce the desired functionality for the complete circuit.

The step of converting the equations to a set of interconnected cells is done in a way to obey constraints in some costs (typically required frequency) while minimizing other costs (typically area and power). This step is referred to as technology mapping, and there are several tools available from different vendors or universities to perform technology mapping. The inputs to this tool typically are a design, a predesigned library and the optimization goals. The quality of a cell-based design depends heavily on the quality of the library that is used for the design. The scope of the invention presented here is to produce better libraries, having as a consequence better designs and a more efficient way to perform timing closure.

Cell-based design can involve the concepts of mapped and unmapped designs, source library, optimization goals, design constraints, target library, available logic functions, synthesis engine, cell drive strength, drive strength distribution, cell p-to-n (P/N) ratio and skew variants, cell topology variants, cell buffer variants, cell folding variants, multistage cells and stage gain on multistage cells. These concepts are briefly discussed below.

Mapped and Unmapped Design. A design is said to be mapped when it is expressed as a network of interconnected cells from a library. Each cell in the library may be instantiated many times; some may be less instantiated (even just once) and some cells available in the library may not be used at all. A design is said to be unmapped when it is described at a higher level, without making references (instantiations) of cells from a library as subdesigns.

Technology Mapping. Technology mapping is the task of minimizing design costs while converting an unmapped design into a mapped design.

Remapping. Remapping refers to the conversion of a mapped design into a different mapped design.

Technology-Independent Optimization. Technology-independent optimization refers to the conversion of an unmapped design into a different unmapped design.

Unmapping. Unmapping refers to the conversion of a mapped design into an unmapped design.

Source Library. When the initial design is a mapped design, it is associated with a library (by definition a mapped design is associated to one or more libraries). The source library is the library to which the initial design is associated.

Optimization Goals and Design Constraints. Optimization goals and design constraints describe to the optimization tool the requirements of the designer for the particular design being treated. Typically the optimization tool receives a mix of optimization goals and design constraints, which can be expressed for various points of the circuit.

Examples of this include: (1) The minimization of area and power while respecting desired arrival times and frequencies, (2) the reduction of timing (delay) while respecting maximum area, and (3) to respect maximum area while increasing yield. Many other combinations of design goals and constraints can be used by designers to achieve their goals without limiting the scope of the method.

Target Library. For any optimization step that produces a mapped design, which will refer to a library, it is necessary to specify the target library, containing the cells that can be used by the mapping tool. It is possible for mapping tools to deal with more than one target library, as the available cells can be divided into different libraries.

Available Logic Functions. Each library has a number of available logic functions that can be implemented as a single cell from the library. Functions that are not directly available in the library as a single cell can be implemented as an interconnection of several cell instances. Indeed, one of skill will recognize that any combinational logic function can be implemented by using multiple instances of a NAND2 cell. Depending on the designer of the library, the choice of available logic functions can include more or less logic functions. This can vary from just a few functions to more than a thousand different functions available as cells, for different experiments reported in the literature.

Synthesis Engine for Mapping Design. A synthesis engine for mapping design is a software tool to produce a mapped design. At that time, some constraints are respected (e.g., required frequency or maximum area) and some design costs (e.g., area or power consumptions) are reduced. The synthesis engine takes an initial design, a source library, a target library, and a set of design constraints and optimization goals. The synthesis engine can be used in incremental modes for faster turnaround.

The output of the synthesis engine is a mapped design that refers to (e.g., instantiates) cells from the target library. The initial design can be an unmapped design. In any implementation of the invention, the source library may not be necessary. The source library and the target library can be the same library.

FIG. 3 shows a synthesis engine for mapping a design. The synthesis engine includes an initial design 305, a source library 301, a target library 310, and a set of design constraints or optimization goals 315. The process includes the movement of the associated data through the synthesis engine for mapping design 320, which produces the mapped design 325 and further the target library 330. These concepts, together with the presented references, clearly define the scope and background of the invention.

An advantage of the proposed method is to provide an automatic way to generate a library that covers a continuous spectrum for a wide variety of cell variants. This way, users can obtain a cell library that has the full potential to provide the support for high performance integrated circuit design.

Cell drive strength. The drive strength of a cell is a relative measure of the output load (capacitance) it can drive. The drive strength variants are versions of a given cells with same transistor networks and same (or roughly the same) relative proportion among transistors, but with different transistor sizes so that the cells are aimed to have different abilities to deliver current at the output. This way, different drive strengths are viewed as options to drive different output loads or capacitances.

FIG. 4A and FIG. 4B are two examples of different drive strengths for a 2-input NAND cell.

Drive Strength Distribution. The distribution of drive strength is an important factor for the quality of a library. It is important for timing closure to have a continuous or nearly continuous spectrum of library cells. One important characteristic is the maximum gap in the drive strength distribution.

Cell P/N Ratio and Skew Variants. Skew variants are versions of given cells with same transistor networks and same (or roughly the same) relative proportion among transistors of the same type, but different ratios between PMOS and NMOS transistors. Normally skew variants offer cells with different P/N ratios but same (or roughly the same) input capacitance. This way, different skew variants are used to balance effects of asymmetric transitions, especially on critical paths.

FIG. 5A and FIG. 5B show examples of two different skew variants for a 2-input NAND cell.

Cell topology variants. The topology variants are versions of a same cell such that the interconnection of transistors is different (nonisomorphic). This can include internally dividing a cell stage into more than one stage or vice versa, and changing the order of serially connected transistor networks, or any other method to derive a nonisomorphic transistor network that performs the same logic function.

FIG. 6A and FIG. 6B show two topologies for a 3-input NAND cell. A single stage topology is meant to be a single stage composed of six transistors while the three stage topology has ten transistors (four transistors for each of 2-input NAND and two transistors for the inverter).

Cell Buffer Variants. Cell buffer variants are topology variants of a cell obtained by internally buffering the output.

Cell Folding Variants. Cell folding variants are topology variants of a cell that basically divide large transistors into an equivalent number of smaller transistors connected in parallel. The basic reason to perform folding is to adapt the transistor topology of the cell to the desired cell template. A given cell template normally has a maximum transistor size it can accommodate. This way, transistors larger than the maximum supported by the target library template have to be divided into smaller transistors connected in parallel.

Multistage cells. Multistage cells are cells which are composed of more than one static CMOS complex gate. Multistage cells can happen for at least three different reasons. First, the use of internal buffering implies multistage cells. This is the case of a 2-input NAND cell with a 2-stage internal buffer at the output.

Second, multistage cells are used to limit the number of series transistors. This is the case of a 6-input NAND cell, which cannot be implemented as a single stage cell as the use of six series transistors is not efficient due to electrical reasons.

Third, multistage cells can happen due to the nature of the logic function implemented in the cell. This is the case of any cell having binate or positive unate inputs. For instance a 2-input and cell is normally implemented with two stages: a 2-input NAND followed by an inverter.

Stage Gain on Multistage Cells. In the case of multistage cells, intermediate stages will be driving other intermediate stages or the output stage. The drive strengths of different stages will in most cases be distinct for each of the stages. The ratio of drive strengths between successive stages determines the gain of internal (nonoutput) stages. This is an important parameter for multistage cells.

Library Template. As the final layout of the complete design is done by placing cells side by side, the design of the cells is restricted so that they will fit together more easily when placed this way. Vendors can provide libraries with different templates to accommodate different design goals, like low power consumption or high speed. It is not uncommon for a vendor to provide at least three different standard cell libraries for the same technology node: general purpose, high speed and low power versions of the libraries.

These libraries will use different templates and have different row heights and power grid sizes. Thus, designers can choose among the three different versions of the library to accommodate their designs. Library templates are discussed in other techniques with the name of cell architecture. Library templates are also discussed in U.S. Pat. No. 6,539,533 with the name of cell constraints file or cell overall plan, which is incorporated by reference.

Drive Strength, Size, and Area. The drive strength of a cell is related to the ability of a cell to provide current to charge or discharge an output node. For multistage cells, the drive strength depends mainly on the last stage of the cell. The "size" of the cell can be measured with different meanings, such as input capacitance of the cell, sum of transistor sizes (widths) or final area after layout. The word size then depends on context.

For cells having the same topology, the area of a particular drive strength cell tends to be proportional to the drive strength. However, this is just a tendency. This is not the case for drive strengths with different topologies. For example, consider a multistage cell topology with an output buffer, which is smaller than the unbuffered version for high drive strengths, and larger than the unbuffered version for smaller drive strengths.

After obtaining a sized transistor network for a particular cell, it may need folding when performing the final layout of the cell. It may also be necessary to adapt it to a particular library template, which can also make the relation between drive strength and area less linear than expected previously.

The quality of a library has a large influence on the quality of the final design. For example, previous methods have cited that "a cell library with only two drive strengths may be 25 percent slower than an ASIC library with a rich selection of drive strengths and buffer sizes, as well as dual polarities for functions (gates with and without negated output)."

A problem this method solves is the design of a set of cells containing cell variants that are more adequate for efficient timing closure of high performance design. The cell variants can include a mix of drive strength variants, P/N ratio variants, topology variants (including buffer and stage variants, as well as varying the gain among stages).

Previous approaches have been devoted to add intermediate sizes to cells already available in the library. The data for the intermediate sizes is derived from the cells present in the library used as an input. Unlike these approaches, the goal of the method presented here is to be able to create a continuous distribution of cells from scratch, without depending on pre-existing cells.

Another approach includes two experiments to verify how the quality of a library affects the quality of the final design. These experiments have been reported in recent approaches; however, they have not been reproduced for a more recent technology. Furthermore, these approaches have not detailed the specific methods used to construct the libraries they use. Therefore, unlike the proposed method of this invention, previous methods have not provided any description on how to derive the continuous libraries.

With respect to this prior art, the invention described in this application describes a way to provide a continuous distribution of cells sizes (drive strengths) and P/N ratios. This class of prior art was not concerned to generate the libraries they use.

Some approaches have experimented with cell libraries, including the use of what is called a semicustom approach, which relies on continuously sized libraries. These approaches consider a fixed P/N ratio per cell, which is optimized before synthesis. According to these approaches, "the topological design space of the gates is restricted to varying the p- to n-FET width ratio and the optimal ratio is determined analytically." Still, according to these approaches, the single P/N ratio is justified as, " . . . the optimal P/N ratio of any CMOS gate depends only on the gate type and the corresponding timing arc but is entirely independent of the structure of the circuit path."

The distribution of sizes does not consider P/N variants, instead an "optimal" P/N ratio is derived analytically. Also, a few assumptions used are for single-stage cells, and this approach assumes "a well designed library avoids multistage cell designs (e.g., buffers inside cells)." The technique of the present invention differs as it considers alternative P/N variants as opposed to prior art where a single "optimal" P/N ratio is derived analytically for each cell. The method presented in this application also has the ability to treat multistage cell designs.

Other methods heavily depend on creating new drive strengths by connecting cells in parallel. However, these approaches present problems with respect to delay testing due to the parallel connection of cells for obtaining new drive strengths. The use of parallel cells to create new drive strengths causes flow problems, notably with delay testing. The method described in this application does not rely on connecting cells in parallel.

A goal of other methods has also been to investigate the effect of varying the degree of continuity of a cell library. These methods have derived a library with ratio 1.05 in between cells and a library with ratio 1.3 in between cells. These approaches do not have any of the following notions: (1) automatic generation of cell sizes, (2) including different P/N ratios as cell variants, (3) including transistor topologies as cell variants, (4) scaling cell sizes to cover a target output capacitance range, and (5) sizing of the seed cells.

Unlike these other methods, the method described in this application does have the following notions: (1) automatic generation of the cell sizes, (2) including different P/N ratios as cell variants, (3) including transistor topologies as cell variants, (4) scaling cell sizes to cover a target output capacitance range, and (5) sizing of the seed cells. Furthermore, in a specific implementation, a set of cell sizes are created or generated having corresponding drive strengths from a received seed size. A subset of the generated cells may be chosen or selected to be part of the cell library.

Other approaches are also devoted for sizing cells in a library without including the notion of several different drive strengths. These approaches do not deal with continuous libraries and do not provide means to generate a continuous distribution. The invention has the advantage of providing means to generate a continuous distribution of sizes (drive strengths) and P/N ratios.

Other methods proposed size cells so that they will have a predetermined delay at a nominal function load (which is used for all the cells with the same functionality). These prior methods depend on the load values used as loads for each of the functions and it does not treat adequately different topologies.

Other methods also ignore the dependency of the delay on side inputs and on the input slope which cause problems when sizing cells based on expected delay. The invention has the advantage of scaling based on transistor sizes and gain. Additionally, the method is based on targeting a range of output load values as opposed to a single load for each of the functions in the library. This feature allows treating adequately different topologies, including multistage cells.

The scaling based on gain avoids the dependency of the delay on side inputs and on the input slope which cause problems when sizing cells based on expected delay. Also the technique considers different P/N ratios, which has not been addressed in other methods.

A library can be used to expand and contract the design space in order to overcome local minima. By contrast, a goal of the invention is to generate from scratch a library that represents a continuum space for the choice of cells. Furthermore, the method provides a continuous distribution of cells sizes (drive strengths) and P/N ratios.

Given a desired functionality to be inserted in a cell library, it is possible to derive a transistor network that implements the desired functionality. This is the basis of switch theory and different transistor networks can be generated to implement a given functionality.

FIG. 7 shows three different transistor networks that implement a 3-input NAND cell. FIG. 7A is a single stage network, FIG. 7B is a three-stage network where all the stages have been limited to (at most) two transistors in series, and FIG. 7C is also a three stage network with a two-stage output buffer. All the networks in FIGS. 7A, 7B, and 7C can be viewed as topology variants for implementing a 3-input NAND cell.

One of skill will appreciate than on specific situations any of the three topology variants can present advantages. For example, FIG. 7C variant tends to have smaller area for high drive strengths (at an expense of a larger intrinsic delay), while FIG. 7A will have smaller area for small drive strengths (and always a smaller intrinsic delay compared to FIG. 7C for same drive strength). FIG. 7B has the advantage of providing one high-speed input (at the last stage of the cell), and it is useful for unbalanced arrival times.

Any of the three transistor networks in FIG. 7 can be sized to have a better proportion among the transistors that compose the network. As an example of this method, FIG. 8 shows two differently sized networks derived from the network in FIG. 7C.

The network in FIG. 8A is an area-oriented size version of the cell, in which the gain for the internal stages is 4. FIG. 8B is a speed-oriented size version, where the gain for the internal stages is 2.5. Any of the alternative sizes presented in FIG. 8 can be used as seed sizes to generate a continuous distribution of drive strengths.

Once a sized version of the network implementing a cell is available, it is possible to generate a nearly continuous distribution of drive strengths. Different drive strengths of a same cell roughly preserve the proportion among the size (width) of transistors in the cell.

When comparing the two alternative drive strengths shown in FIG. 9A and FIG. 9B the ratio between the drive strengths is three, meaning that the network on FIG. 9B is able to cope with a load three times larger under same timing conditions, compared to the network on FIG. 9A.

Consider that the network in FIG. 9A was designed to drive a capacitance C; then the network in FIG. 9B is designed to drive a capacitance 3C. For the sake of simplicity, let's call the network in FIG. 9A an X1 and the network in FIG. 9B an X3 drive strength. If these networks were the only available, and a circuit has to be designed to drive a capacitance equal to 1.7C, the X3 cell would be 76 percent oversized and the X1 would be 41 percent undersized.

Ideally, the designer could have a 0 percent error if a continuously sized library is available. However, the use of a continuously sized library is not possible, as it is too expensive to design and maintain such a library. Nearly continuous libraries can be used to bring the cost of library development to a manageable and acceptable level. This is one of the advantages of this invention, to allow the user to rapidly exploit the degree of continuity of a library.

This concept is illustrated through table A below, which shows the rounding error when picking a cell from the library to implement a target X1.7 cell (not available in the library). Note that an average of the relative errors for rounding up or down the cell reduces as sizes are added.

TABLE A

| # of sizes | Sizes available | Undersize error | Oversize error |
| --- | --- | --- | --- |
| 2 | X1 and X3 | −41% (X1) | +76% (X3) |
| 3 | X1, X1.73 and X3 | −41% (X1) | +2% (X1.73) |
| 4 | X1, X1.44, X2.08 and X3 | −15% (X1.44) | +22% (X2.08) |
| 5 | X1, X1.32, X1.73, X2.28 and X3 | −22% (X1.32) | +2% (X1.73) |
| 6 | X1, X1.25, X1.55, X1.93, X2.41 and X3 | −8.8% (X1.55) | +14% (X1.93) |

The method presented here addresses the following aspects in generating a distribution of cells to insert in a library: (a) What is the range of capacitances the alternative versions of the cell have to drive? (b) Which is the maximum error admitted when rounding a cell? (c) How to distribute cell sizes in between? (d) How many cells are allowed by the designer?

The method provides means to generate a distribution of cells from a seed size network, a target range of capacitances to be driven, a maximum rounding error, and a distribution function. At the same time, the method helps to control a trade off between the maximum rounding error that can arise for the distribution and the number of cells in the library. These aspects of the method are discussed below.

The range of output capacitances to be driven by the cells has to be related to the cell sizes that will be available in the library. The smallest cell in the library has to be designed to drive the smallest capacitance in the target range; while the largest cell in the library is designed to drive the largest capacitance in the target range. This observation implies the need to be able to scale the seed size of the network in such a way it is adapted to drive a specific target output capacitance. Several means can be adopted to make this scaling of the seed size to the output capacitance of the cell.

One method is to scale the seed size of the cell to drive the target capacitance with a gain that is in an acceptable range. The gain of the cell relates pin input capacitance with the target output capacitance to be driven. The acceptable range of gains for a cell can be computed by using the logical effort theory.

One of skill would appreciate that the effective fan out of a cell can be adjusted between fan out 1 and fan out 10 using equation (1) below, where LE is the logical effort of the cell, Cout is the target output capacitance and Cin is the input capacitance of an input pin of the cell.

Equation (1) is represented by the formula: $1 < LE*(Cout/Cin) < 10$

Consider that the seed cell is scaled to a fixed gain FG, to generate the sizes in the library, as shown in equation (2) below. In this case, equation (3) shows that the size of the transistors in the network (represented by Cin) is directly proportional to Cout, as FG and LE are constant for the seed and scaled cells. Note that the gain the cells will have when instantiated from the library will not be equal to the specific value of FG, the value of FG is only used to adapt the distribution of sizes in the library to the range of capacitances that is expected in a given application.

The use of a smaller FG will result in larger cells and shift the distribution to the highest output capacitance in the target range; conversely, using a larger FG will result in smaller cells and shift the distribution to the smallest output capacitance in the target range. Using a value of FG around 4 is a good value as it would result in a distribution of cells covering the target range with and effective fanout of 4 (which is referred as FO4 for one of skill).

Equation (2) is represented by the formula: $LE*(Cout/Cin) = FG$

Equation (3) is represented by the formula: $Cin = (LE/FG)*Cout$

A distribution of drive strengths between an interval of target capacitances delimited by a minimum capacitance an a maximum target capacitance. A maximum capacitance has to be done in such a way to be able to drive any target output capacitance in the range with a cell from the library with a maximum (allowed) rounding error specified by the designer. In fact, the maximum error can be a parameter to generate the distribution, in order to guarantee a nearly continuous library.

FIG. 10 shows a bidimensional distribution grid illustrating the use of seven different drive strengths and five different P/N ratios derived from the initial seed, resulting in a distribution containing 35 different sizes. From the initial distribution derived from a given seed, it is possible to generate P/N ratio variants for every cell.

The P/N ratios are variations of a cell that have similar input capacitance, but different ratios of PMOS and NMOS sizes. This will generate a bidimensional grid containing different drive strengths and P/N ratios derived from the initial seed. It is also possible to generate seeds with different P/N ratios and then scale these seeds to cover the drive strength (target output capacitance) interval with a similar effect.

Figure 11A:
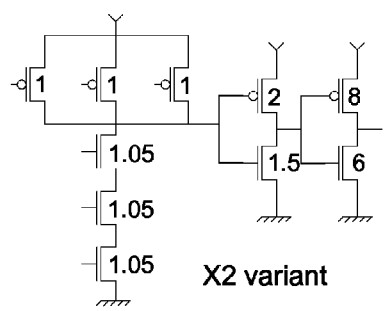
FIG. 11A and FIG. 11B show an example of Pareto simplification.

FIG. 11A shows one example of Pareto simplification. The size and P/N ratio distributions can be generated for more than one network topology targeting the same logic function. In this implementation of the method, it is possible to perform Pareto simplifications for cells designed to drive the same target output capacitance. A cell with worst-case area and delay can be excluded from the library if another cell designed for the same target capacitance provides always a smaller area and delay.

Figure 11B:
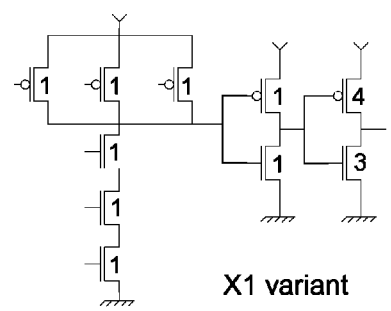

Pareto simplifications are also possible for cells with the same topology, as shown in FIG. 11B. The X1 variant has several transistors rounded up to the minimum technology size; this way, the X2 variant is able to deliver more current to the output, while having approximately the same input capacitance and a similar delay. This way, the X1 variant could be eliminated from the distribution because the X2 is always better if these parameters are the only taken into account.

The method can be executed to produce distributions of drive strengths and P/N variants for each seed size independently. This allows for parallel implementations of the method, as parallel computers are becoming more available. It is also possible to select different ratios for drive strengths of different functions.

This way, more used cells like inverters and buffers can have a smaller error and a wider coverage compared to less frequent cells. Additionally, different seed networks can be targeted to different target output capacitance ranges as a function of the seed topology, notably the number of stages.

Pareto analysis can be performed on different seed networks associated to the same logic functionality. This includes selection of just the smaller area (before or after layout) variant, smaller ΣW variant, smaller input capacitance, smaller intrinsic delay or smaller power consumption variant for each drive strength; more broadly, Pareto analysis could select any combination of the winning cells listed before.

The method can also be applied to memory elements, flip-flops (FFs) and latches. However, in these specific cases some transistors of the seed network cannot be scaled or have specific scaling rules. For example, it is possible to scale only the inverters connected to the output or add an output buffer for the specific purpose of scaling the drive strengths of memory elements, flip-flops (FFs) and latches.

When using an output buffer it may not be needed for small drive strengths. Pareto simplification could eliminate these cases when more than one seed network is used for the same topology. The Transistor network can be automatically generated for a given functionality. This step is optional, and one (or more) networks could be directly given by the user. Methods to derive switch networks are provided in previous methods.

A second issue in the invention is the production of an initial seed size for a network. One way of doing this is to use a table of transistor sizes as presented in table B below and FIG. 12.

TABLE B

| # of transistors in series | Size of NMOS | Size of PMOS |
|---|---|---|
| 1 | 1 | 1.5 |
| 2 | 1.38 | 1.97 |
| 3 | 1.59 | 2.28 |
| 4 | 1.75 | 2.64 |

Table B gives the transistor sizes to be used depending on the number of transistors in series in the longest path the transistor belongs. The size in FIG. 12 can be related to table 2 in a straightforward manner.

Figure 12A:
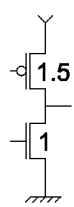
FIG. 12A, FIG. 12B, and FIG. 12C show three different seed cells sized from the table of transistor sizes.
Figure 12B:
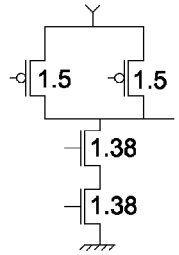
Figure 12C:
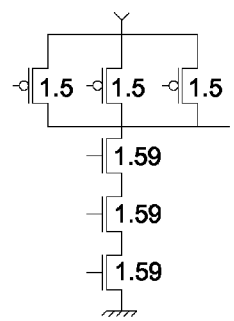

FIGS. 12A, 12B, and 12C show three different seed cells sized from the table of transistor sizes. Paths are taken from the output of a cell stage to a power supply. When there is more than one path, the longest one determines the size. Notice that the method to derive an initial seed size presented here is for the purpose of illustration, not for limitation. Several alternative methods can be used to size the initial network to produce a seed size, including the analytical method to compute a single P/N ratio per cell presented in earlier methods.

FIG. 13A through 13D show a third aspect of the method where scaling the seed size of the cells to scale to a given target output capacitance is used. Consider the size X8. The midstage, the inverter with PMOS W=8 and NMOS W=6 has a gain of approximately 4, as Cout/Cin=(32+24)/(8+6)=56/14=4 (this assumes the inverter has logical effort LE=1).

The same reasoning can be done for the three input NAND, assuming it has a logical effort of LE=1.8; this way, gain=LE*(Cout/Cin)=1.8*((8+6)/(2.1+4.2))=1.8*14/6.3=4. The same reasoning can be applied forward to the output stage of the cell, using the equation gain=LE*(Cout/Cin), which can be rewritten as Cout=(gain*Cin)/LE. This way, the target output capacitance with gain 4 can be computed as Cout=(4*(32+24))/1=224. Using the same reasoning it is easy to verify that the target output capacitance for the cell sizes in FIG. 13 are as shown in Table C below.

TABLE C

| Cell size | Target output capacitance |
|---|---|
| X1 | 28 |
| X2 | 56 |
| X8 | 224 |
| X16 | 448 |

FIG. 13 shows a seed cell and three different sizes derived by scaling the seed size of the cell. Considering that the sizes in FIG. 13 are normalized to the minimum transistor size in the target technology, the X1 and X2 variants have transistors smaller than the technology minimum.

Figure 14A:
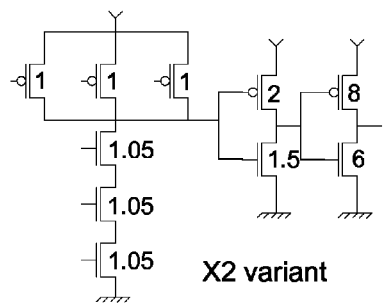
FIG. 14A and FIG. 14B show smaller sizes from FIG. 13A and FIG. 13B with transistors rounded up to respect the technology minimum.
Figure 14B:
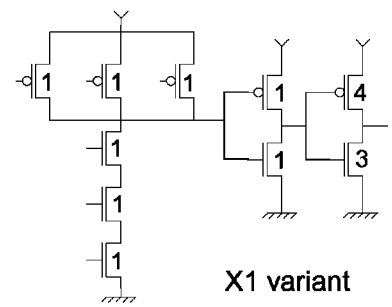
Figure 15A:
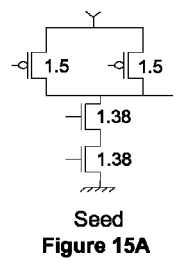
FIG. 15A through FIG. 15H show a distribution of seven different sizes derived from an initial seed size.
Figure 15B:
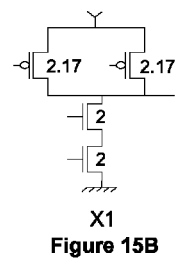
Figure 15C:
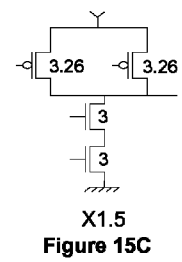
Figure 15D:
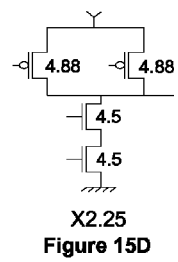
Figure 15E:
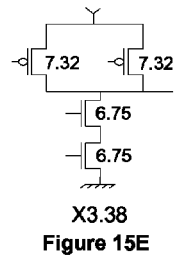
Figure 15F:
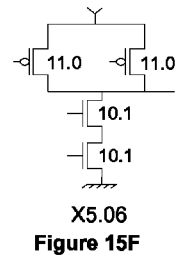
Figure 15G:
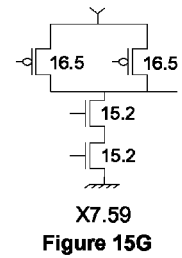
Figure 15H:
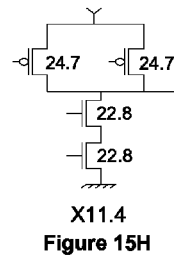
Figure 16A:
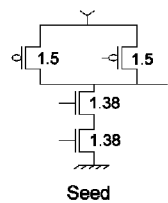
FIG. 16A through FIG. 16H show a distribution of seven different sizes derived from an initial seed size, to cover a target output capacitance range with minimum capacitance too small.
Figure 16B:
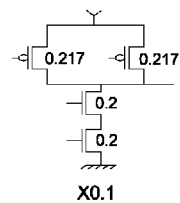
Figure 16C:
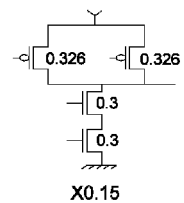
Figure 16D:
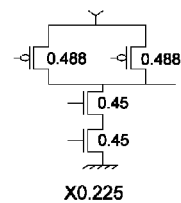
Figure 16E:
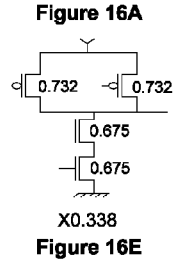
Figure 16F:
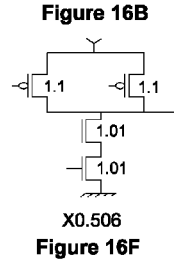
Figure 16G:
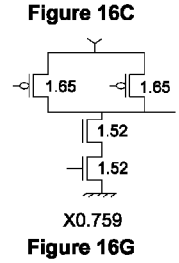
Figure 16H:
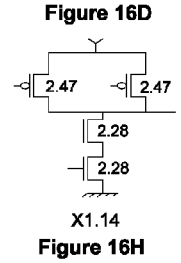
Figure 17A:
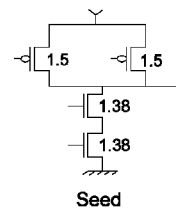
FIG. 17A through FIG. 17H show the distribution from FIG. 16A though FIG. 16H with transistors rounded up to technology minimum resulting in four equal cell sizes.
Figure 17B:
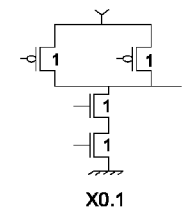
Figure 17C:
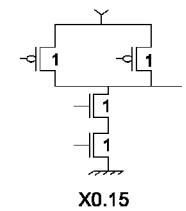
Figure 17D:
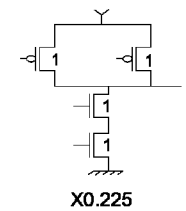
Figure 17E:
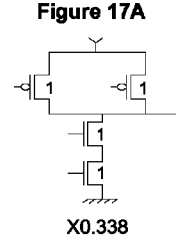
Figure 17F:
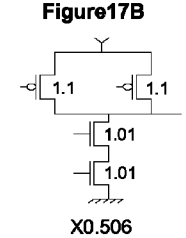
Figure 17G:
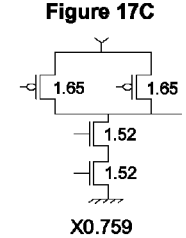
Figure 17H:
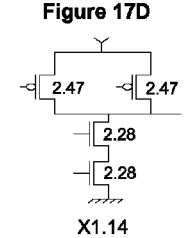
Figure 18A:
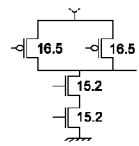
FIG. 18A through FIG. 18D show three different skew variants derived from a reference cell.
Figure 18B:
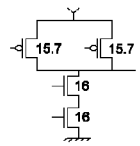
Figure 18C:
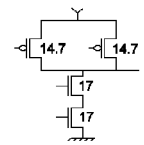
Figure 18D:
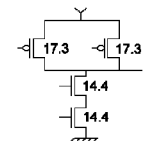

FIG. 14 is an example of when the transistors have to be rounded-up to the minimum of the technology. The method to scale the seed size presented in FIG. 14 is meant for the purpose of illustration, and should not be a limitation to the method presented here. Several alternative ways can be used to scale the initial seed size to produce networks targeting specific output capacitances.

In a fourth aspect of the invention, a nearly continuous distribution of drive strengths must be created for the target output range. Consider the distribution presented originally in table C and repeated in table D below, considering different gains for the last stage of the cells. In other implementations of the method, the four sizes presented in FIG. 13 will have the target output capacitances varying with the target gain assumed for the last stage of the networks.

TABLE D

| Cell size | Target output capacitance with g = 2.5 | Target output capacitance with g = 3.6 | Target output capacitance with g = 4 |
|---|---|---|---|
| X1 | 17.5 | 25.2 | 28 |
| X2 | 35 | 50.4 | 56 |
| X8 | 140 | 201.6 | 224 |
| X16 | 280 | 403.2 | 448 |

Table D above illustrates the variation of the target output capacitance as a function of the target gain attributed to the last stage. Table D was generated with the transistor sizes shown in FIG. 13, so the gain of intermediate stages is fixed and equal to 4, as described previously. The maximum error in between two successive sizes can be computed through the equation $C_i*(1+E)=C_{i+1}(1-E)$, so that $E=(C_{i+1}-C_i)/(C_{i+1}+$ $C_i$). Therefore, from table D, the maximum error E for a target capacitance between X2 and X8 sizes for g=2.5 is given by E=(140−35)/(140+35)=0.6. The maximum errors with g=3.6 and with g=4 are also E=0.6. The change is the target capacitance for which the error occurs; the maximum error occurs for C=56 with g=2.5, for C=80.64 with g=3.6 and for C=89.6 for g=4.

The main observation is that the maximum error remains constant (60 percent) for all the three distributions (g=2.5, g=3.6 and g=4) even if the target capacitance that causes the maximum error changes (C=56, C=80.64 and C=89.6). If the distribution of cells has an acceptable error in between cells, the gain used to scale the cells will only matter on the extremes of the distribution, as the sizes in the extremes will not have neighbor sizes.

As shown in table E below, using a smaller gain (g=2.5) will move the distribution towards larger cells (favoring the high end of the size distribution), while using a smaller gain (g=7.5) will move the distribution towards smaller cells (favoring the low end of the size distribution).

Table E below shows the effect on the cells sizes (expressed in sum of transistor widths) when scaling the cells to adapt a seed size to a target output capacitance using different gains (seed sizes always the same). The "sizes" in table E are shown in terms of sum of transistor widths. This illustrates a tendency in the cell size. The final area of the cells can vary as a function of folding, transistor placement and routing and other issues when adapting the layouts of the cells to a particular library template.

This issue can be addressed by adopting a gain that is more near the average used (FO4, for instance) and by tying the extremes of the target distribution to cover the extremes with zero error (which allows to have a margin of error for target output capacitances outside the extremes of the distribution). Notice that the values presented in table E were all generated by using the same seed cell (intermediate stages have gain equal to 4) and a different gain for the output stage for scaling purpose.

TABLE E

| Target Capacitance | ΣW with g = 2.5 | ΣW with g = 3.6 | ΣW with g = 4 | ΣW with g = 7.5 |
|---|---|---|---|---|
| 120 | 76.2 | 52.92 | 47.63 | 25.4 |
| 200 | 127 | 88.19 | 79.38 | 42.33 |
| 300 | 190.5 | 132.29 | 119.06 | 63.5 |
| 400 | 254 | 176.39 | 158.75 | 84.67 |

Table F below shows the effect on the size of the cells when the gain at intermediate stages is used to generate different seed cells. Specifically, table F shows the effect on the cells sizes (expressed in sum of transistors widths) when scaling the cells to adapt a seed size to a target output capacitance using different gains (seed sizes always the same) and using the same gain to scale intermediate stages.

Here, the sum of transistor widths (ΣW) is not linearly proportional to the gain as it was the case in table E. The "sizes" in table F are shown in terms of the sum of transistor widths. This illustrates a tendency in the cell size. The final area of the cells can vary as a function of folding, transistor placement and routing and other issues when adapting the layouts of the cells to a particular library template. The cells in table F were generated with a single gain for all stages (the scaling gain is the same gain used for intermediate stages). Modifications at the gain for intermediate stages could be used to generate different seed sizes, as shown previously in FIG. 8.

TABLE F

| Target Capacitance | ΣW with g = 2.5 | ΣW with g = 3.6 | ΣW with g = 4 |
|---|---|---|---|
| 120 | 108.67 | 56.48 | 47.63 |
| 200 | 181.12 | 94.14 | 79.38 |
| 300 | 271.68 | 141.20 | 119.06 |
| 400 | 362.24 | 188.27 | 158.75 |

A goal of a nearly continuous library is to minimize the rounding error when selecting a cell from the library to drive a target output capacitance with a target gain. It has been demonstrated that for the distributions in table D the maximum error occurs for C=56 with g=2.5, for C=80.64 with g=3.6 and for C=89.6 for g=4.

The capacitance for which the maximum error occurs is always between the sizes X2 and X8, which are the most distant successive sizes. In order to reduce this error is possible to create a new size between X2 and X8. When the capacitance for the intermediate cell is chosen as the capacitance that causes the maximum error (C=56), the error is not evenly distributed between the two newly created intervals.

Table G below shows that the maximum error in the interval 35-56 is 23.1 percent, while the maximum error in the interval 56-140 is 42.9 percent. The choice of an intermediate target capacitance to cause an even distribution can be done using equations (4) and (5), which express the errors in the first and in the second interval.

$$C_i^*(1+E_1) = C_{intermediate}(1-E_i) \quad (4)$$

$$C_{intermediate}^*(1+E_2) = C_{i+1}(1-E_2) \quad (5)$$

TABLE G

| | Smaller Capacitance | Larger Capacitance | Maximum error in between | Capacitance for maximum error |
|---|---|---|---|---|
| Intermediate cell with C = 56 | 35 | 56 | 23.1% | 43.1 |
| | 56 | 140 | 42.9% | 80.0 |
| Intermediate cell with C = 70 | 35 | 70 | 33.3% | 46.7 |
| | 70 | 140 | 33.3% | 93.3 |

By making $E_1=E_2$ (to distribute the error evenly among the intervals) and dividing left and right sides of equation (4) by the respective right and left sides of equation (5), equation (6) is obtained. From equation (6) is possible to derive equation (7), which expresses $C_{intermediate}$ as a function of $C_i$ and $C_{i+1}$. From equation (7) it becomes clear that a target output capacitance distribution that minimizes the error is a geometric progression as a target output capacitance that minimizes the error is the geometric mean of its smaller and larger nearest neighbors.

$$\frac{C_i}{C_{intermediate}} = \frac{C_{intermediate}}{C_{i+1}} \quad (6)$$

$$C_{intermediate} = \sqrt{C_i \cdot C_{i+1}} \quad (7)$$

Note that the method to produce a nearly continuous distribution of drive strengths presented here is for the purpose of illustration, and not meant to limit the technique of the invention. Several alternative implementations of the method may distribute the drive strengths targeting specific output capacitances.

For instance an arithmetic progression would minimize the absolute error of the distribution; or the user can provide or interact with an initial distribution to generate the distribution with the characteristics he or she wants, minimizing errors that present more significance to the designer.

In a fifth aspect of the invention, distributions of target capacitances have to be computed to cover a target range of capacitances. The parameters for this distribution are the following:

P1 is a minimum target output capacitance in the range.

P2 is a maximum target output capacitance in the range.

P3 is a maximum error allowed in between two successive cell sizes.

P4 is a maximum number of cells allowed by the user.

P5 is a gain used to scale the last stage of the seed cells.

These parameters interact among them in a number of ways. For instance, increasing the distance among P1 and P2 will tend to increase the error in between two successive cells (P3) or the number of necessary cells to keep P3 under a given threshold.

The gain used to scale the seed cells (P5) will shift the distribution towards larger cells (when the gain is reduced) or smaller cells (when the gain is increased). This way, a user can generate different libraries by modifying these parameters. In the following, some combinations of parameters are exemplified for better understanding of the method.

FIG. 15A through FIG. 15D show the creation of a distribution of 2-input NAND sizes from an initial seed size. Combinations 1 to 4 discussed below take into the consideration a distribution of 2-input NAND sizes from the seed size shown in FIG. 15.

Combination 1. Assume that the logical effort of this cell is 1.67. Consider that the designers want initially the parameters P1=10, P2=100, P3=20 percent, P4=7, and P5=4. From these parameters, the distribution on FIG. 15 is generated using a geometric progression with ratio of 1.5, which gives an intermediate error of 20 percent in between successive sizes, as $E=(1.5-1)/(1.5+1)=0.2=20$ percent. The resulting distribution on FIG. 15 has in practice the following parameters: P1=10, P2=114, P3=20 percent, P4=7, and P5=4.

One of skill would appreciate that some trade-offs are possible, like reducing the size of the largest cell, which is aimed to a target output capacitance of 114. This would allow redistributing all the sizes in order to reduce overall maximum error. By doing so it is possible to adopt a ratio of 1.47, which gives an intermediate error of $E=(1.47-1)/(1.47+1)=0.19=19$ percent. This way the largest size would be an X10, aimed at a target output capacitance of 100.

By adopting this trade-off, an alternative distribution with the following parameters is obtained P1=10, P2=100, P3=19 percent, P4=7 and P5=4. A different trade-off is to shift the distribution to the smaller cells while maintaining the error in 20 percent (and the ratio in 1.5). This approach for trading off leads to another alternative distribution with parameters P1=9.35, P2=106.5, P3=20 percent, P4=7 and P5=4.

Combination 2. Assume that the logical effort of this cell is 1.67. Consider that the designers want initially the parameters P1=10, P2=100, P3=30 percent, P4=12, and P5=4. This distribution is very easy to achieve. In this case the user should decide the priorities to be followed. The choices are to minimize the number of cells respecting the maximum error, using the maximum number of cells and reducing the error, extending the interval P1-P2 while using the maximum number of cells, or using a weighted combination of stretching these goals.

Combination 3. Assume that the logical effort of this cell is 1.67. Consider that the designers want initially the parameters P1=10, P2=100, P3=15 percent, P4=5, and P5=4. However, this distribution is impossible to obtain. The designer should then adopt a trade off to arrive to a possible distribution. The options then are to allow an increase in the number of cells or the maximum error, or both, allow a reduction in the covered interval, or using a weighted combination for relaxing the initial conditions.

FIG. 16 shows a distribution of seven different sizes derived from an initial seed size, to cover a target output capacitance range with minimum capacitance smaller than needed.

Combination 4. Assume that the logical effort of this cell is 1.67. Consider that the designers want initially the parameters P1=1, P2=10, P3=20 percent, P4=7, and P5=4. This distribution would start with the size X0.1, and the first four sizes (X0.1 to X0.338) in the distribution would have all transistors with sizes smaller than the technology requirement. Thus, these cells have transistors rounded up to the technology minimum, resulting in four identical cells, as shown in FIGS. 17A through 17H below.

This way, the intended original parameters are not a good choice, and the first cell size with transistors not to be rounded up is the X0.5 size. Below the X0.46 size, all the transistors have to be rounded up to the technology minimum and in practice no different sizes are produced. As before, the generation of the distribution as required by the designer produces a diagnosis that can be used to derive a better trade-off in the selection of the parameters.

The method to produce a nearly continuous distribution of target capacitances specifying drive strengths presented is for the purpose of illustration, not meant to be a limitation to the technique of the invention. Several alternative ways can be used to distribute the drive strengths targeting specific output capacitances. For example an arithmetic progression would minimize the absolute error of the distribution where the user can provide or interact with an initial distribution to generate the distribution with the characteristics he or she wants.

In a sixth aspect of the invention, it is possible to generate P/N variants of seed cells. As described previously, the skew variants are versions of a given cells with same transistor networks and same (or roughly the same) relative proportion among transistors of the same type, but different ratios between PMOS and NMOS. Normally skew variants offer cells with different P/N ratios but same (or roughly the same) input capacitance.

FIG. 18A through FIG. 18D show three different skew variants derived from a reference cell. For the reference cell, the P/N scale factor is 1 (reference) and the reference P/N ratio is 16.5/15.2=1.0855. In order to produce P/N variants of the reference cell, a P/N scale factor can be used to multiply the reference P/N to produce a variant P/N ratio. For instance, the variant with a P/N scale factor of 0.9 has a ratio P/N=0.9*1.0855=0.9770. This computed ratio is then used to divide the original input pin capacitance of 31.7 (16.5+15.2) such that the new ratio is obtained (15.7/16=0.9770) and the input capacitance remains the same (15.7+16=31.7).

Notice that this procedure is used to scale the ratio among the sizes between PMOS and NMOS for a given input pin. When there is more than one transistor of the same type (PMOS or NMOS) connected to the same input pin, the proportion among the same type transistors is preserved.

The method to produce P/N variants for a specific cell presented here is for the purpose of illustration and not meant to limit the technique of the invention. Several alternative ways can be used to produce P/N variants for a specific cell. For example, the table of transistor sizes to size the cell could be scaled to produce P/N variants. In the case of multistage cells, different P/N scale factors could be applied to each stage.

Figure 19A:
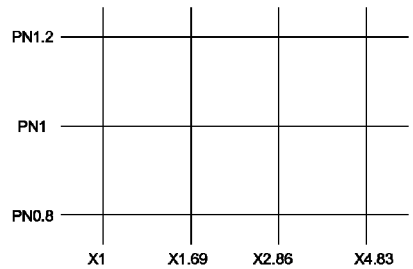
FIG. 19A, FIG. 19B, and FIG. 19C show three different size distributions derived from a given seed cell. The figure is divided into three items: (a) sparse distribution, 12 cells; (b) narrow distribution, 12 cells; and (c) 37-cell distribution.
Figure 19B:
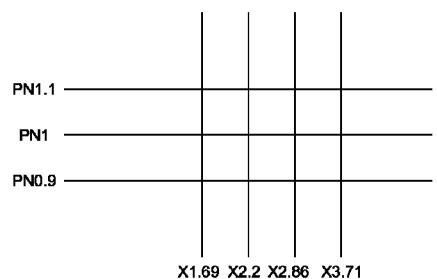
Figure 19C:
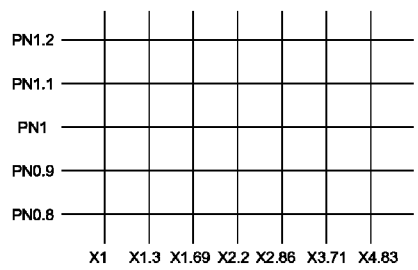
Figure 20A:
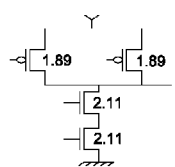
FIG. 20A through FIG. 20F show six-cell distribution illustrating drive strengths and P/N ratios.
Figure 20B:
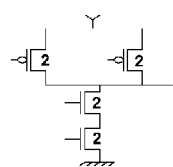
Figure 20C:
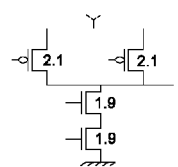
Figure 20D:
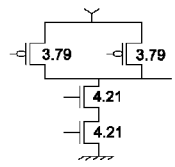
Figure 20E:
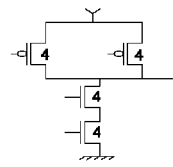
Figure 20F:
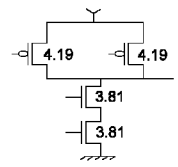

FIG. 19 shows an example of a seventh aspect of the invention where it is possible to align distributions of drive strengths with distribution of skew (P/N ratio) variants. Three different size distributions are shown. The first distribution is a sparse distribution of 12 different sizes. The second distribution is a narrow distribution of 12 different sizes. These distributions illustrate the trade-off between enlarging the space covered by the set of cells and reducing the error (in between cells). The third distribution has 35 cells and illustrates the cost of having broad coverage with a small error in between cells.

FIG. 20 shows the transistor network sizes for a distribution of two drive strengths and three P/N ratios illustrating six different cells. Notice that the distributions can be obtained by first distributing the drive strengths and then generating the P/N ratio variants for each drive strength; or by generating the P/N ratios for the seed scaled to X1 and then generating size distributions from each P/N ratio seed cell.

The method can be executed in other implementations of the invention to produce distributions of drive strengths and P/N variants for each seed size independently. This allows for parallel implementations of the method, as parallel computers are becoming more available. Also, it is possible to select different ratios for drive strengths of different functions. This way, more used cells like inverters and buffers can have a smaller error and a wider coverage compared to less frequent cells. Different seed networks can be targeted to different target output capacitance ranges as a function of the seed topology, notably the number of stages.

Pareto analysis can be performed on different seed networks associated to the same logic functionality. Examples of this include selecting just the smaller area (before or after layout) variant, smaller $\Sigma W$ variant, smaller input capacitance, smaller intrinsic delay or smaller power consumption variant for each drive strength; more broadly, Pareto analysis could select any combination of the winning cells listed before.

The method can also be applied to memory elements, flip-flops (FFs) and latches, considering that for these specific cases some transistors of the seed network are not scaled or have specific scaling rules. For example, it is possible to scale only the inverters connected to the output or add an output buffer for the specific purpose of scaling the drive strengths of memory elements, flip-flops (FFs) and latches. When using an output buffer it may not be needed for small drive strengths. Pareto simplification could eliminate these cases when more than one seed network is used for the same topology.

In general, the technique of the invention presented here has a greater ability to treat multistage transistor networks in a single cell, using the gain in between stages as a parameter. The notion of performing Pareto analysis to eliminate dominated sizes is also an advantage of the invention presented.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for sizing cells of a cell library comprising:
receiving a seed size for a cell;
receiving a distribution of target drive strengths for the cell;
using at least one processor, creating, from the received seed size, a set of cell sizes for a set of cells, each cell in the set of cells having a corresponding drive strength to the received distribution of target drive strengths; and
storing the set of cell sizes for the set of cells on a computer-readable medium.

2. The method of claim 1 further comprising:
selecting a subset of the set of cells; and
adding the subset to the cell library.

3. The method of claim 1 further comprising:
generating the seed size based on a table of transistor sizes.

4. The method of claim 1 further comprising:
generating the seed size based on an array of transistor sizes.

5. The method of claim 1 further comprising:
generating the seed size based on a plurality of transistor sizes.

6. The method of claim 1 further comprising:
receiving a functionality for a cell; and
generating alternative transistor networks for the cell based on the functionality.

7. The method of claim 6 further comprising:
receiving a distribution of target P/N ratios for the cell; and
creating from the received seed size, a set of cell sizes for a set of cells, each cell in the set of cells having a corresponding P/N ratio of the received distribution of target P/N ratios.

8. The method of claim 7 further comprising:
generating the seed size based on a plurality of transistor sizes.

9. The method of claim 6 further comprising:
selecting a subset of the set of cells; and
adding the subset to the cell library.

10. The method of claim 6 further comprising:
generating the seed size based on a table of transistor sizes.

11. The method of claim 6 further comprising:
generating the seed size based on an array of transistor sizes.

12. The method of claim 6 further comprising:
generating the seed size based on a plurality of transistor sizes.

13. The method of claim 6 wherein the cell comprises multiple stages.

14. The method of claim 1 wherein the cell comprises multiple stages.

15. The method of claim 1 further comprising:
receiving a distribution of target P/N ratios for the cell; and
creating from the received seed size, a set of cell sizes for a set of cells, each cell in the set of cells having a corresponding P/N ratio of the received distribution of target P/N ratios.

16. The method of claim 15 further comprising:
selecting a subset of the set of cells; and
adding the subset to the cell library.

17. The method of claim 15 further comprising:
generating the seed size based on a table of transistor sizes.

18. The method of claim 15 further comprising:
generating the seed size based on an array of transistor sizes.

19. The method of claim 15 further comprising:
generating the seed size based on a plurality of transistor sizes.

20. The method of claim 15 wherein the cell comprises multiple stages.

* * * * *